United States Patent
Taussig

[11] Patent Number: 6,163,999
[45] Date of Patent: Dec. 26, 2000

[54] FRAME ELEMENT FOR A PICTURE FRAME

[76] Inventor: Doris Taussig, Friedlgasse 8, A-1190 Vienna, Austria

[21] Appl. No.: 09/341,017
[22] PCT Filed: Jan. 12, 1998
[86] PCT No.: PCT/AT98/00002
§ 371 Date: Jul. 1, 1999
§ 102(e) Date: Jul. 1, 1999
[87] PCT Pub. No.: WO98/31264
PCT Pub. Date: Jul. 23, 1998

[30] Foreign Application Priority Data

Jan. 16, 1997 [AT] Austria ..................................... 27/97 U

[51] Int. Cl.⁷ ...................................................... A47G 1/06
[52] U.S. Cl. ................................. 40/798; 40/783; 403/401
[58] Field of Search ............................... 40/798, 799, 782, 40/783, 784; 403/401

[56] References Cited

U.S. PATENT DOCUMENTS

| 144,599 | 11/1873 | Burch | 40/799 |
|---|---|---|---|
| 1,595,648 | 8/1926 | Corley | 40/778 |
| 2,591,565 | 4/1952 | Linnard | 40/799 |
| 3,722,121 | 3/1973 | Olczewski | 40/799 |
| 5,246,304 | 9/1993 | John . | |
| 5,465,514 | 11/1995 | Ulysse . | |
| 5,735,068 | 4/1998 | Houssian | 40/782 |
| 5,799,429 | 9/1998 | Speshyock | 40/778 |

FOREIGN PATENT DOCUMENTS

| 0 254 684 | 1/1988 | European Pat. Off. . |
|---|---|---|
| 2 632 509 | 12/1989 | France . |
| 3805511 A1 | 8/1989 | Germany . |
| 686 553 | 4/1996 | Switzerland . |
| 2 286 526 | 8/1995 | United Kingdom . |

Primary Examiner—Cassandra H. Davis
Attorney, Agent, or Firm—Nixon & Vanderhye P.C.

[57] ABSTRACT

A frame element for a picture frame includes two interconnectable supporting elements embracing the frame corners, wherein one supporting element includes upper and lower supporting members adapted to receive a frame member; the upper supporting member having a first coupling element thereon; and a decoration element having a second coupling element thereon, wherein the first and second coupling elements cooperate to removably secure the decoration element to the upper supporting element.

8 Claims, 2 Drawing Sheets

FRAME ELEMENT FOR A PICTURE FRAME

TECHNICAL FIELD

The invention relates to a frame element for a picture frame.

BACKGROUND

Picture frames and, in particular, frames for photos are offered in different dimensions and different make-ups. In addition to picture frames having but few ornamental decorations, a number of configurations have become known, in which the frame elements are designed to be profiled or decorated in a more or less sophisticated manner. Frames with particularly exuberant decorations in most cases, however, after some time will make the observer feel that the frame is no longer appropriate. On the other hand, it is not always easy, despite the great variety of different frames, to find the frame intended for a particular decorative effect among the huge assortment available, wherefor the desire to change or decorate frames later on in order to adapt them to certain occasions or a certain environment becomes understandable.

FR-2 632 509 shows and describes a picture frame essentially consisting of four longitudinal sections as well as four corner connections capable of being inserted into the end faces of the sections. On the longitudinal section side are provided longitudinal ribs to which decorative slip-on elements are attachable via said sections or via said corner connections.

From GB-2 286 526A a frame system has become known, in which sectional ledges externally including joints for receiving decoration elements are provided. As decoration elements, corner elements or pediments are, for instance, used, which may be fastened to the external side of the frame, e.g., by the aid of a glue.

From CH-686 553 A5, an angle element for assembling sections to frames has become known. Therein, the sectional ledges are inserted into the angle elements formed in one piece, wherein the internal surface of the angle element is designed to correspond with the external profile of the sectional ledges so as to ensure a precise fit of the sectional ledges in the angle elements. The angle element may include openings for fastening additional decorative elements.

SUMMARY OF THE INVENTION

The invention aims at providing a frame element for picture frames, by which it is readily feasible to basically change frames in respect of their esthetic overall impression retroactively in a simple manner without involving cumbersome adaptation work. To solve this object, the invention consists in a frame element for picture frames, comprising a lower supporting element, in which an upper supporting element is inserted in a manner that the frame element may be adapted to any desired frame heights with the supporting elements embracing the frame corners, and wherein, on the upper side of the upper supporting element, a reception means is provided in the form of a snap fastener, which cooperates with a respective coupling member of a decoration element such that the decoration element, after closing of the snap fastening closure, is rotatable in its position. Due to the fact that two interconnectable supporting elements embracing the frame corners are provided, with the upper supporting element being inserted in the lower supporting element, universal elements may be proposed, which can be adapted to any desired frame heights and frame shapes in a simple manner. The supporting elements embrace the frame corners and can be detachably connected with one another in a simple manner. By the fact that one supporting element comprises a reception means in the form of a snap fastener cooperating with a respective coupling member of a decoration element and capable of being detachably connected with the same, it has now become feasible to attach decoration elements of any shape and configuration to such supporting elements, thus allowing the overall appearance of the frame to be fundamentally changed. The decoration elements in that case may be designed in a particularly simple manner, lending themselves also to a subsequent individual design by the user. Decoration elements may readily be covered with cloth or painted such that, in the main, plenty of scope is left to one's individual and personal design.

According to a preferred further development of the frame element according to the invention, the configuration is devised such that the supporting elements carry at least one pin and one sleeve, respectively, such that the pin of one supporting element can be inserted into the sleeve of the other. In that manner, the supporting elements may be connected with one another in a simple manner, wherein the fitting between the pin and the sleeve may be devised such that the pin can be positively inserted into the sleeve, thereby safeguarding the support required for carrying the decoration element.

In the following, the invention will be explained in more detail by way of exemplary embodiments schematically illustrated in the drawings, wherein, however, the reception means in the drawing is represented in the form of a non-inventive rail instead of the snap fastener according to the invention.

BRIEF DESCRIPTION OF THE DRAWINGS

Therein.

DETAILED DESCRIPTION OF THE DRAWINGS

Figure 1:
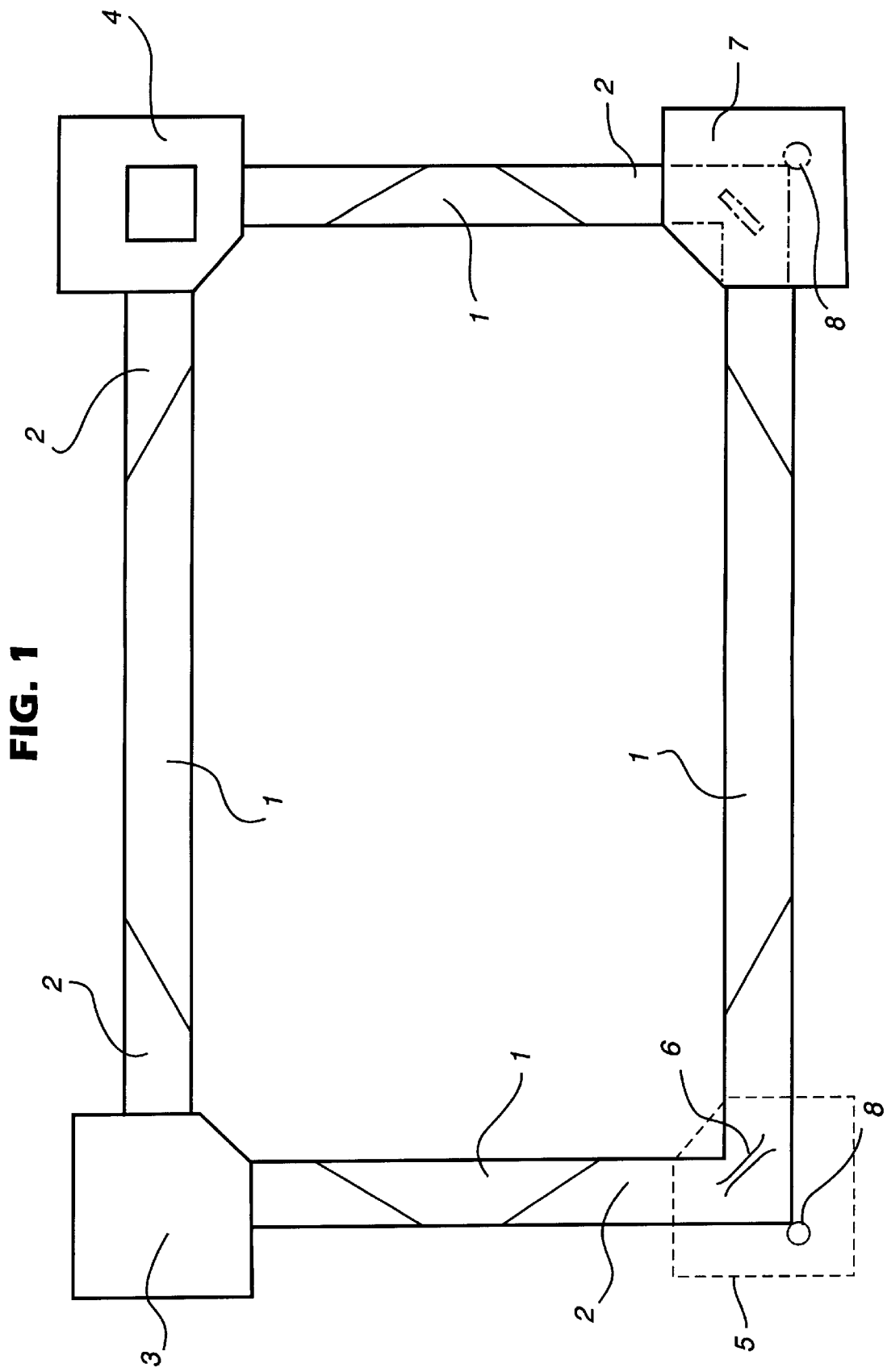
FIG. 1 is a top view of a frame comprising the supporting elements as well as decoration elements according to the invention.

FIG. 1 depicts a frame whose frame members are denoted by 1. Supporting elements 2 are attached to the corners of such a frame. In the left-hand upper corner of FIG. 1, a first decoration element 3 locked with such a supporting element 2 is visible. The right-hand upper corner of the frame according to FIG. 1 comprises a modified decoration element 4. In the left-hand lower corner of the frame according to FIG. 1, the decoration element is indicated by broken lines 5, a reception means in the form of a rail 6 being visible on the upper side of the supporting element 2. In the right-hand lower corner, the contour of the frame or supporting element 2 below the decoration element 7 is represented by dot-and-dash lines. In the two lower corners of FIG. 1 sleeves 8 are each to be seen, into which respective pins of the cooperating supporting element 9 arranged therebelow may be inserted in order to thereby embrace the corners of the frame.

Figure 2:
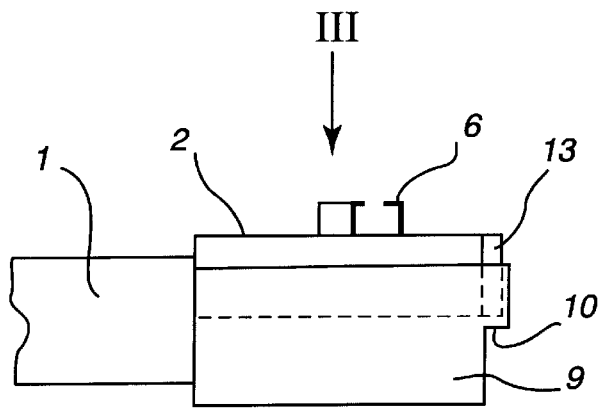
FIG. 2 is a side view of a frame having supporting elements slipped on with the decoration element taken off.
Figure 3:
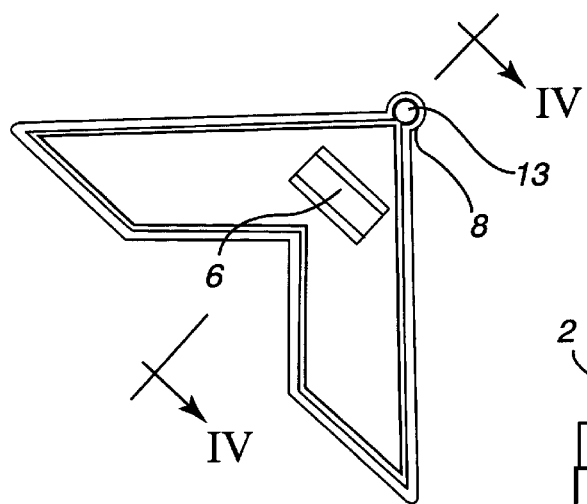
FIG. 3 is a view in the direction of the arrow III of FIG. 2.
Figure 4:
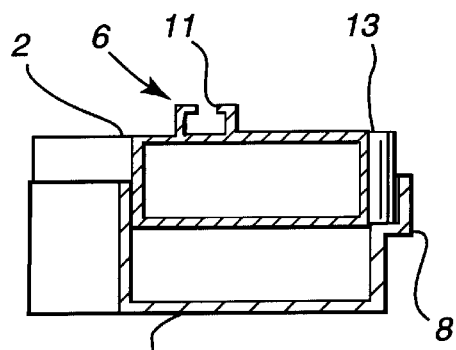
FIG. 4 is a section through a supporting element along line IV—IV.

From the illustration according to FIG. 2, it is apparent that the upper supporting element 2 is inserted in a lower supporting element 9. The lower supporting element 9 is designed to be cranked with the protruding edge being denoted by 10 such that the upper supporting element 2 can be slipped into the lower supporting element 9. On the upper side of the upper supporting element a reception means or first element 6 for cooperating with a second element or coupling member 12 constituted by a rail is again visible. The supporting elements 2 and 9 embrace the frame corners so as to ensure an esthetic appearance also in the side view. FIGS. 3 and 4 each depict a sleeve 8 on lower supporting element 9 for receiving a pin 13 of the upper supporting element 2, wherein, as is particularly apparent from FIG. 4, the reception means 6 for the coupling element 12 has re-entrant rims 11 in order to thereby ensure a positive connection when fixing the decoration element.

Figure 5:
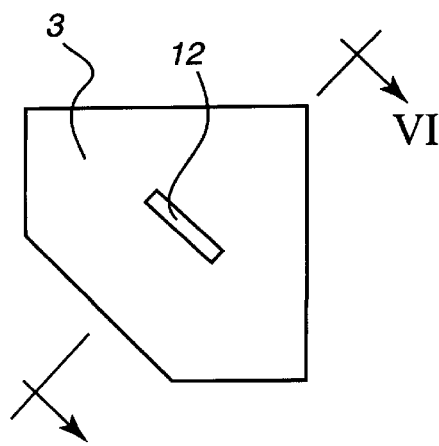
FIG. 5 is a top view on a decoration element for locking in a supporting element according to FIGS. 2, 3 or 4.
Figure 6:
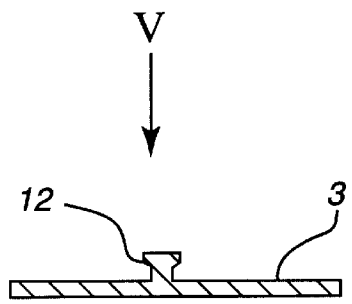
FIG. 6 is a section through a decoration element according to FIG. 5 along line VI—VI of FIG. 5, FIG. 5 being a top view in the sense of the arrow V of FIG. 6.

FIGS. 5 and 6 illustrate the decoration element, which is again denoted by 3 in those Figures. The decoration element 3, on its side facing the supporting element 2, comprises a coupling member 12 capable of being locked with the reception means 6 for the coupling member in case the reception means 6 and/or the coupling member 12 is accordingly elastically deformable. Alternatively, the coupling member 12 can also be laterally inserted into the reception means 6 and displaced into the desired position. The coupling member 12 and the reception means 6 in that case are each dimensioned so as to ensure a positive fixation in the desired position.

I claim:

1. A picture frame corner element comprising separable upper and lower supporting members adapted to receive a frame member; said upper supporting member having a first coupling element fixed thereon; and an ornamental decoration having a second coupling element fixed thereon, wherein said first and second coupling elements cooperate to removably secure said ornamental decoration on said upper supporting member and thus change the aesthetic appearance of said corner element.

2. The picture frame corner element of claim 1 wherein said upper and lower supporting members are provided with cooperating male and female elements, respectively, that are engaged to thereby adjustably connect said upper and lower supporting members.

3. The picture frame corner element of claim 2 wherein said male and female elements comprise a pin and sleeve, respectively.

4. The picture frame corner element of claim 3 wherein said upper supporting member is receivable within said lower supporting member.

5. A picture frame corner element comprising separable upper and lower supporting members adapted to receive a frame member; said upper supporting member having a first coupling element fixed thereon; and an ornamental decoration having a second coupling element fixed thereon, wherein said first and second coupling elements cooperate to removably secure said ornamental decoration on said upper supporting member and thus change the aesthetic appearance of said corner element, wherein one of said first and second coupling elements comprises a rail having a pair of opposed re-entrant rims thereon.

6. A picture frame comprising four frame members connected together at four corners by respective corner elements, each corner element comprising separable upper and lower supporting members adapted to receive a frame member; said upper supporting member having a first coupling element fixed thereon; and an ornamental decoration having a second coupling element fixed thereon, wherein said first and second coupling elements cooperate to removably secure said ornamental decoration on said upper supporting member and to thereby change the aesthetic appearance of said picture frame.

7. The picture frame of claim 6 wherein said upper and lower supporting members are provided with cooperating male and female elements, respectively, that are engaged to thereby connect said upper and lower supporting members.

8. The picture frame of claim 7 wherein said male and female elements comprise a pin and sleeve, respectively.

* * * * *